United States Patent
Kumar et al.

(10) Patent No.: US 10,611,474 B2
(45) Date of Patent: Apr. 7, 2020

(54) UNMANNED AERIAL VEHICLE DATA MANAGEMENT

(71) Applicant: International Business Machines Corporation, Armonk, NY (US)

(72) Inventors: Abhishek Kumar, Elmsford, NY (US); Ashish Kundu, Elmsford, NY (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 15/463,147

(22) Filed: Mar. 20, 2017

(65) Prior Publication Data

US 2018/0270244 A1 Sep. 20, 2018

(51) Int. Cl.
| | | |
|---|---|---|
| *H04L 29/06* | (2006.01) | |
| *B64C 39/02* | (2006.01) | |
| *H04W 4/029* | (2018.01) | |
| *H04L 9/32* | (2006.01) | |
| *H04W 4/44* | (2018.01) | |

(52) U.S. Cl.
CPC ......... *B64C 39/024* (2013.01); *H04L 9/3236* (2013.01); *H04L 9/3239* (2013.01); *H04W 4/029* (2018.02); *H04W 4/44* (2018.02); *H04L 2209/38* (2013.01); *H04L 2209/84* (2013.01)

(58) Field of Classification Search
None
See application file for complete search history.

(56) References Cited

U.S. PATENT DOCUMENTS

| | | |
|---|---|---|
| 2004/0249519 A1 | 12/2004 | Frink |
| 2010/0084513 A1 | 4/2010 | Gariepy et al. |
| 2014/0018979 A1 | 1/2014 | Goossen et al. |

(Continued)

FOREIGN PATENT DOCUMENTS

| | | |
|---|---|---|
| WO | 2015024129 A1 | 2/2015 |
| WO | 2015085393 A1 | 6/2015 |
| WO | 2016022864 A3 | 2/2016 |

OTHER PUBLICATIONS

S. Brakeville et al., "Blockchain Basics: Introduction to Business Ledgers," https://www.ibm.com/developerworks/cloud/library/cl-blockchain-basics-intro-bluemix-trs/, May 9, 2016, 9 pages.

(Continued)

*Primary Examiner* — William J. Goodchild
(74) *Attorney, Agent, or Firm* — Eyal Giboa; Ryan, Mason & Lewis, LLP

(57) ABSTRACT

A secure chain of data blocks is maintained at a given computing node, wherein the given computing node is part of a set of computing nodes in a distributed network of computing nodes, and wherein each of the set of computing nodes maintains the secure chain of data blocks. The secure chain of data blocks maintained at each computing node comprises one or more data blocks that respectively represent one or more transactions associated with an unmanned aerial vehicle (UAV). At least one data block is added to the secure chain of data blocks maintained at the given computing node in response to determining that transaction data associated with the at least one data block is valid.

20 Claims, 9 Drawing Sheets

(56) References Cited

U.S. PATENT DOCUMENTS

| | | |
|---|---|---|
| 2015/0206106 A1 | 7/2015 | Yago |
| 2015/0332283 A1 | 11/2015 | Witchey |
| 2016/0284033 A1* | 9/2016 | Winand ................ G06Q 50/06 |
| 2017/0238234 A1 | 8/2017 | Dowlatkhah |
| 2017/0285633 A1* | 10/2017 | Poornachandran .. G05D 1/0022 |
| 2017/0300855 A1 | 10/2017 | Lund et al. |
| 2018/0111683 A1 | 4/2018 | Di Benedetto et al. |

OTHER PUBLICATIONS

PSGS' Thoughts, "Using Block-Chains to Transfer Data," https://psgs.tk/blog/thoughts/2014/05/16/transferring-data-with-blockchains/, May 16, 2014, 6 pages.

Emanuel Parzen, "On Estimation of a Probability Density Function and Mode," The Annals of Mathematical Statistics, Sep. 1962, pp. 1065-1076, vol. 33, No. 3.

Murray Rosenblatt, "Remarks on Some Nonparametric Estimates of a Density Function," The Annals of Mathematical Statistics, Sep. 1956, pp. 832-837, vol. 27, No. 3.

* cited by examiner

| BLOCK 1 | BLOCK 2 | BLOCK 3 | BLOCK 4 | BLOCK 5 | ... | BLOCK N |
|---|---|---|---|---|---|---|
| UAV TRANSACTION 1 | UAV TRANSACTION 2 + HASH VALUE OF BLOCK 1 | UAV TRANSACTION 3 + HASH VALUE OF BLOCK 2 | UAV TRANSACTION 4 + HASH VALUE OF BLOCK 3 | UAV TRANSACTION 5 + HASH VALUE OF BLOCK 4 | ... | UAV TRANSACTION N + HASH VALUE OF BLOCK N-1 |

500

510

UNMANNED AERIAL VEHICLE DATA MANAGEMENT

BACKGROUND

An unmanned aerial vehicle (UAV), commonly referred to as a drone, is an aircraft that operates without a human pilot. UAVs may operate under remote control, or autonomously using an onboard computer system. With the increasing popularity of UAVs, it is becoming more and more important to address privacy and security concerns associated with UAV flight.

SUMMARY

Embodiments provide techniques for management of data associated with unmanned aerial vehicles (UAVs).

In one embodiment, a method comprises the following steps. A secure chain of data blocks is maintained at a given computing node, wherein the given computing node is part of a set of computing nodes in a distributed network of computing nodes, and wherein each of the set of computing nodes maintains the secure chain of data blocks. The secure chain of data blocks maintained at each computing node comprises one or more data blocks that respectively represent one or more transactions associated with an unmanned aerial vehicle (UAV). At least one data block is added to the secure chain of data blocks maintained at the given computing node in response to determining that transaction data associated with the at least one data block is valid. The steps are implemented via at least one processor operatively coupled to a memory associated with the given computing node.

In another embodiment, an apparatus comprises at least one processor and a memory operatively coupled to the processor to form a given computing device that is part of a set of computing nodes in a distributed network of computing nodes, wherein each of the set of computing nodes maintains a secure chain of data blocks. The processor and memory are configured to: maintain the secure chain of data blocks at the given computing node, wherein the secure chain of data blocks maintained at each computing node comprises one or more data blocks that respectively represent one or more transactions associated with an unmanned aerial vehicle (UAV); and add at least one data block to the secure chain of data blocks maintained at the given computing node in response to determining that transaction data associated with the at least one data block is valid.

In yet another embodiment, a computer program product comprises a processor-readable storage medium having encoded therein executable code of one or more software programs. The one or more software programs when executed by the one or more processors implement steps of: maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with a UAV; and adding at least one data block to the secure chain of data blocks maintained at the given computing node in response to determining that transaction data associated with the at least one data block is valid.

Advantageously, illustrative embodiments provide effective techniques for managing data related to a UAV. These illustrative embodiments provide a secure and robust approach to tracking and appending information related to the UAV, particularly when a security risk level is considered to be relatively high. The data may be managed as part of a secure chain of data blocks (e.g., in blockchain networks) associated with the UAV that chronicles a status path of the UAV through its recent and/or complete history. In this manner, the various characteristics and parameters of the UAV may be securely tracked using the secure chain of data blocks, including UAV location (e.g., including elevation), UAV manufacturer and/or model, UAV identification data, UAV capabilities (e.g., camera resolution), UAV flying behavior (e.g., erratic behavior), contextual information (e.g., weather conditions, proximity to a restricted/exclusion zone), etc. Transaction data can be added as a block to the chain more frequently when a risk level is relatively high (e.g., UAV is close to a restricted/exclusion zone).

These and other exemplary embodiments of the invention will be described in or become apparent from the following detailed description of exemplary embodiments, which is to be read in connection with the accompanying drawings.

BRIEF DESCRIPTION OF THE DRAWINGS

FIG. 4 illustrates a blockchain for an unmanned aerial vehicle according to an embodiment of the invention.

DETAILED DESCRIPTION

Illustrative embodiments will be described below for tracking (more generally, managing) data associated with an unmanned aerial vehicle (UAV or drone). While illustrative techniques described herein are particularly well-suited for managing data related to UAVs, it is to be understood that embodiments are not intended to be limited to managing data related to UAVs. Furthermore, while a "blockchain" technology will be described in one or more illustrative implementations, other types of data management technologies that generate a secure chain of data blocks maintained at computing nodes in a distributed network may be employed in one or more embodiments.

Figure 1:
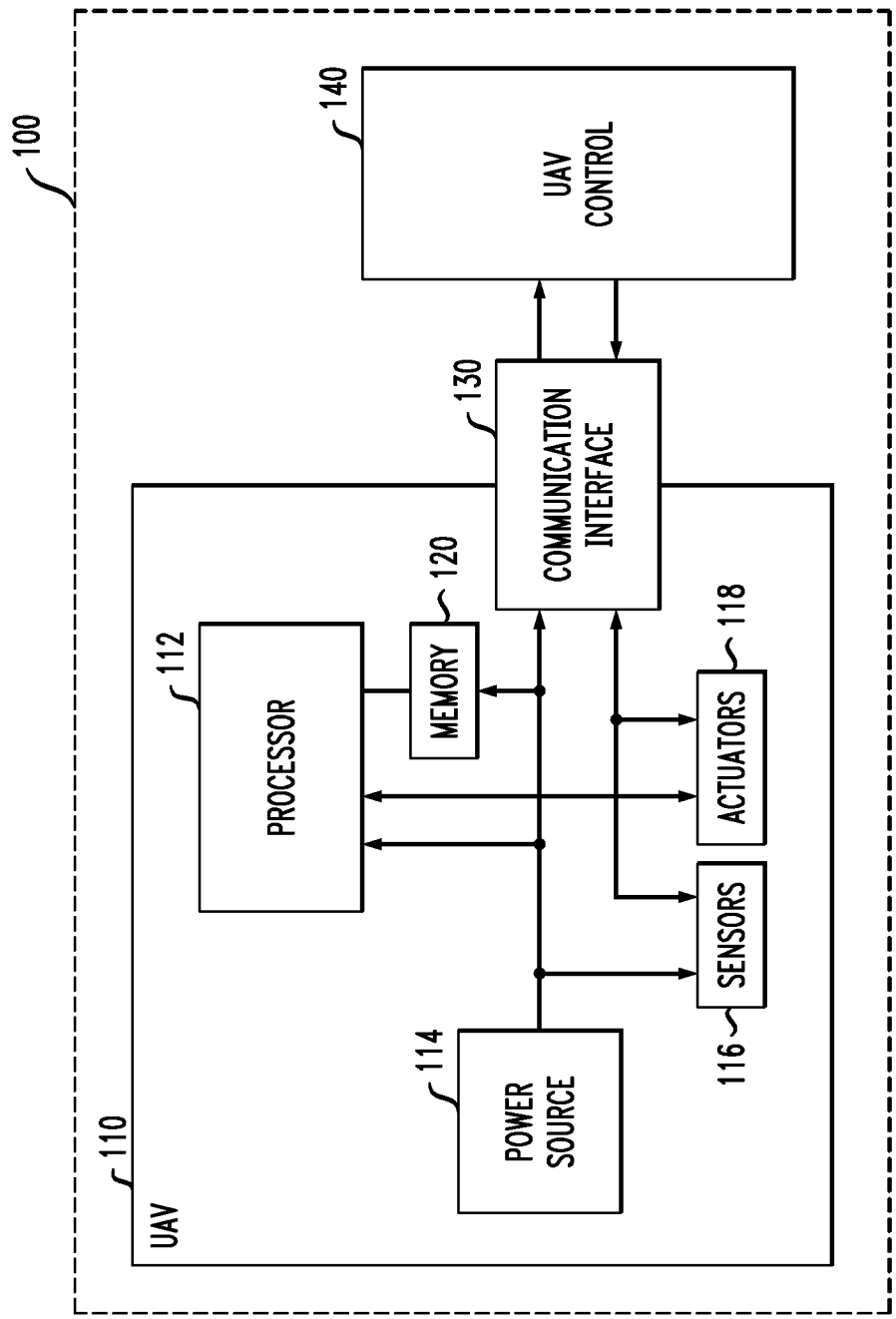
FIG. 1 illustrates a block diagram of a system architecture of an unmanned aerial vehicle system with which one or more embodiments of the invention are implemented.

FIG. 1 illustrates a block diagram of a system architecture of an exemplary UAV system 100. The system architecture may also be considered an unmanned aircraft system. As shown, system 100 comprises UAV 110. UAV 110 is shown comprising processor 112, power source 114, one or more sensors ("sensors") 116, one more actuators ("actuators") 118, and memory 120. Communication interface 130 is shown providing an interface between UAV 110 and UAV control 140, which may be a remote-control device or system (e.g., a ground control station).

More particularly, processor 112 comprises one or more processing devices (e.g., microprocessor, controller, programmable integrated circuit, etc.) configured to control the operations and functions of the UAV 110. Power source 114 comprises one or more power sources (e.g., batteries, etc.) configured to provide electrical power to components of the UAV 110. Sensors 116 comprise one or more devices configured to collect information (e.g., camera, microphone, environmental sensors, etc.) in the vicinity of the UAV 110. Actuators 118 comprise one or more devices configured to actuate one or more mechanisms of the UAV 110 (e.g., a mechanical arm or claw configured to grab and/or release an item). Memory 120 comprises one or more memory/storage devices for storing data associated with operation of UAV 110 (e.g., data collected by sensors 116, flight data and other operational data associated with the UAV).

Still further, the communication interface 130 comprises one or more wireless data transceivers configured to receive data from UAV control 140, as well as transmit data thereto. For example, UAV control 140 may send "fly-by-wire" commands to UAV 110. Fly-by-wire refers to a semiautomatic computer system for controlling the flight of an aircraft (e.g., UAV 110 may be controlled from a remote location by one or more individuals or other systems).

It is to be appreciated that the system architecture 100 shown in FIG. 1 is for illustrative purposes only, and that alternative system architectures for a UAV may be employed in accordance with embodiments of the invention.

Prior to explaining the techniques for managing data associated with a UAV in accordance with illustrative embodiments, a brief explanation of the blockchain technology will now be given.

Blockchain is the name given to a technology that enables creation of a digital ledger or record of transactions and sharing of this ledger or record among a distributed network of computers. Blockchain was originally developed as part of the bitcoin technology. Bitcoin is a digital asset and payment system. Blockchain technology uses cryptography to allow each participant on the network to manipulate the ledger in a secure way without the need for a central point of control. In the context of bitcoin, the blockchain technology maintains a public ledger of all bitcoin transactions that have previously occurred (i.e., a chain of transactions). In the bitcoin case, every compatible client is able to connect to the network, send new transactions to the network, verify transactions, and take part in the competition (called mining) to create new blocks. However, it is realized herein that blockchain technology can be adapted for other transactional applications to establish trust, accountability and transparency without requiring a central authority.

Figure 2:
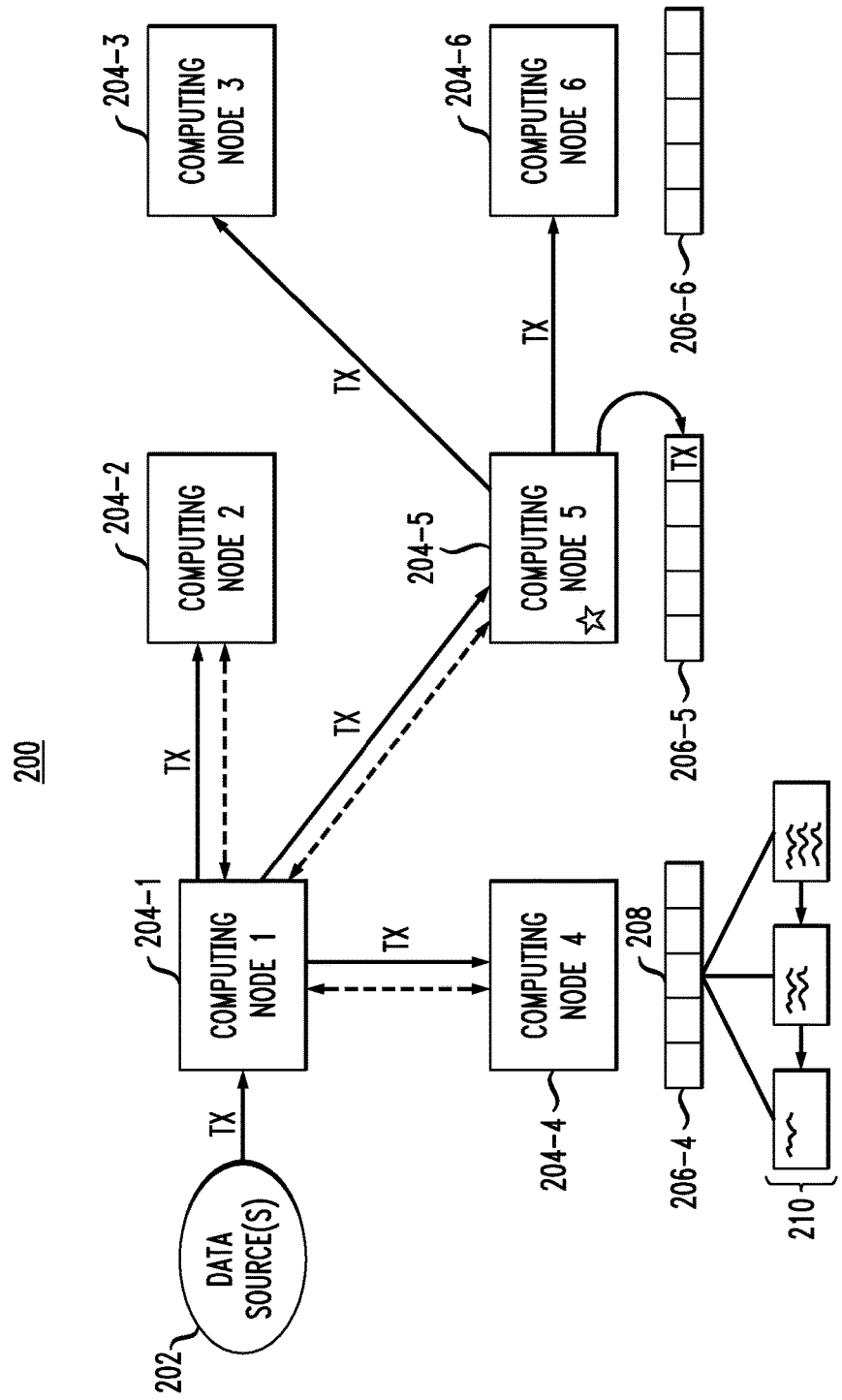
FIG. 2 illustrates a blockchain computational system with which one or more embodiments of the invention are implemented.

FIG. 2 illustrates a blockchain computational system 200 with which one or more embodiments of the invention may be implemented. As shown, the system 200 comprises one or more data sources 202 operatively coupled to at least one of a plurality of distributed peer computing nodes 204-1, 204-2, . . . , 204-6. The system 200 may have more or less computing nodes than the number illustrated in FIG. 2. Each computing node in the system 200 is configured to maintain a blockchain which is a cryptographically secured (via a cryptographic hash function) record or ledger of data blocks that represent respective activities or transactions associated with an asset (e.g., UAV). A cryptographic hash function is a cryptographic function which takes an input (or "message") and returns a fixed-size alphanumeric string, which is called the hash value (sometimes called a message digest, a digital fingerprint, a digest, or a checksum).

In FIG. 2, computing nodes 204-4, 204-5, and 204-6 are shown each maintaining the same blockchain (respectively illustrated as blockchains 206-4, 206-5, and 206-6). Although not expressly shown, each computing node in the system 200 is configured to be able to maintain this same blockchain. Each blockchain is a growing list of data records hardened against tampering and revision (i.e., secure). Each block in the blockchain (illustratively referenced as block 208 in blockchain 206-4) holds batches of one or more individual transactions and the results of any blockchain executables (e.g., computations that can be applied to the transactions). Each block typically contains a timestamp and information linking it to a previous block. More particularly, each subsequent block in the blockchain (e.g., 206-4, 206-5, 206-6, etc.) is a data block that includes a given transaction and a hash value of the previous block in the chain (i.e., the previous transaction). Thus, each data block in the blockchain represents a given set of transaction data plus a set of all previous transaction data (e.g., as illustratively depicted as 210 in FIG. 1).

Assume a new set of transaction data (new transaction TX) is obtained from one of the one or more data sources 202, and received by computing node 1 (204-1). Computing node 1 (204-1) can provide the new transaction TX to all or a subset of computing nodes in the system 200. In this case, TX is sent to computing node 2 (204-2), computing node 4 (204-4), and computing node 5 (204-5).

Note that computing node 204-5 is marked with a star symbol to denote it as a leader in a consensus protocol. That is, the computing nodes in the system 200 each are configured to participate in a consensus protocol as peers with one peer being designated as a leader. Any peer can assume the role of leader for a given iteration of the consensus protocol. In general, the leader receives all transactions from the participating peers in the system and creates a new block for the new transaction. The new block is sent out by the leader node to one or more of the other peer computing nodes (e.g., 204-3 and 204-6 as illustrated in FIG. 2) which double check (validate) that the leader computed the new block properly (i.e., the validating nodes agree by consensus). If consensus is reached, then the computing nodes in the system 100 add the new block to the blockchain they currently maintain. As a result, after the new transaction TX is processed by the system 200, each computing node should now have a copy of the same updated blockchain stored in its memory. Then, when a new transaction comes into the system 200, the above-described process of adding the transaction to the blockchain is repeated.

It is to be understood that any single computing node may itself serve as the receiver, validator, and block generator for new transaction data set. However, in the context of a consensus protocol, the more nodes that validate the given transaction, the more trustworthy the data block is considered.

It is to be further understood that the above description represents one illustrative blockchain computation process and that embodiments of the invention are not limited to the above or any particular blockchain computation implementation. As such, other appropriate cryptographic processes may be used to maintain and add to a secure chain of data blocks in accordance with embodiments of the invention.

Advantages of such a blockchain computational system include: (1) the ability for independent nodes to converge on a consensus of a latest version of a large data set (e.g., a ledger), even when the nodes are run anonymously, have poor interconnectivity and may have operators who are dishonest or otherwise malicious; (2) the ability for any well-connected node to determine, with reasonable certainty, whether a transaction does or does not exist in the data set; (3) the ability for any node that creates a transaction to, after a confirmation period, determine with a reasonable level of certainty whether the transaction is valid, able to take place and become final (i.e., that no conflicting transactions were confirmed into the block chain elsewhere that would invalidate the transaction); (4) a prohibitively high cost to attempt to rewrite or otherwise alter transaction history; and (5) automated conflict resolution that ensures that conflicting transactions never become part of the confirmed data set.

Illustrative embodiments adapt the blockchain computational system 200 of FIG. 2 to manage data associated with a UAV. More particularly, as will be described in detail herein, non-limiting, illustrative embodiments apply blockchain technology to track UAV parameters and activities and append data associated with such parameters and activities as transactions in the blockchain in a secure manner. Management of UAV data is useful for chronicling at least a portion of the history of the UAV. Each entry associated with the chronicled history of the UAV may be embodied as a transaction of the blockchain.

As mentioned above, various characteristics and parameters of the UAV are securely tracked using the secure chain of data blocks including, but not limited to, UAV location (e.g., including elevation), UAV manufacturer and/or model, UAV identification data, UAV capabilities (e.g., camera resolution), UAV flying behavior (e.g., erratic behavior), contextual information (e.g., weather conditions, proximity to a restricted/exclusion zone), etc. Contextual information may be important regarding managing the flight of a UAV. For example, there are currently at least three major UAV no-fly or restricted fly zones: (1) national parks; (2) military bases; and (3) a predetermined radius (e.g., 5 miles) around a major airport. As such, in accordance with illustrative embodiments, transactions are added to the blockchain associated with the UAV more frequently in response to a triggering event, such as when the risk level is high (e.g., flying near one of the no-fly or restricted fly zones). Additionally, a smart contract may be implemented to determine that a UAV operator is meeting agreements regarding operation of the UAV.

A restricted zone need not be stationary. For example, a restricted zone might include a zone defined by a radius from a moving car with a public figure or other important person inside. Additionally, in some scenarios, it may be beneficial to allow a UAV to enter a restricted zone. For example, if the purpose of a UAV is to transport perishable medication, and it would be impossible to avoid the restricted zone to deliver the medication. As such, the UAV may be granted access to fly through the restricted zone for the purpose of transporting the medication.

Furthermore, as will be explained in detail herein, illustrative embodiments provide a blockchain computational system for implementing the above and other management features wherein each computing node comprises controller modules for managing transaction data and blockchain computation. More particularly, each computing node in the system is configured to track information related to the UAV and append the information as transactions in a corresponding block chain.

As such, UAV transactions associated with a given stakeholder (i.e., someone or something that is associated with the given environment) are compiled into a chain of UAV transaction blocks. The chain can be considered a chronicle of a UAV's path through time. When a transaction is conducted, the corresponding UAV parameters are sent to one or more of the computing nodes in the system (FIG. 2) for validation. The one or more computing nodes establish a validity of the transaction and generate a new block. Once the new block has been calculated, it can be appended to the stakeholder's UAV blockchain. Among many other advantages, the use of a blockchain infrastructure helps in identifying misbehaving UAVs by multiple parties and such activities are recorded in an immutable ledger.

Figure 3:
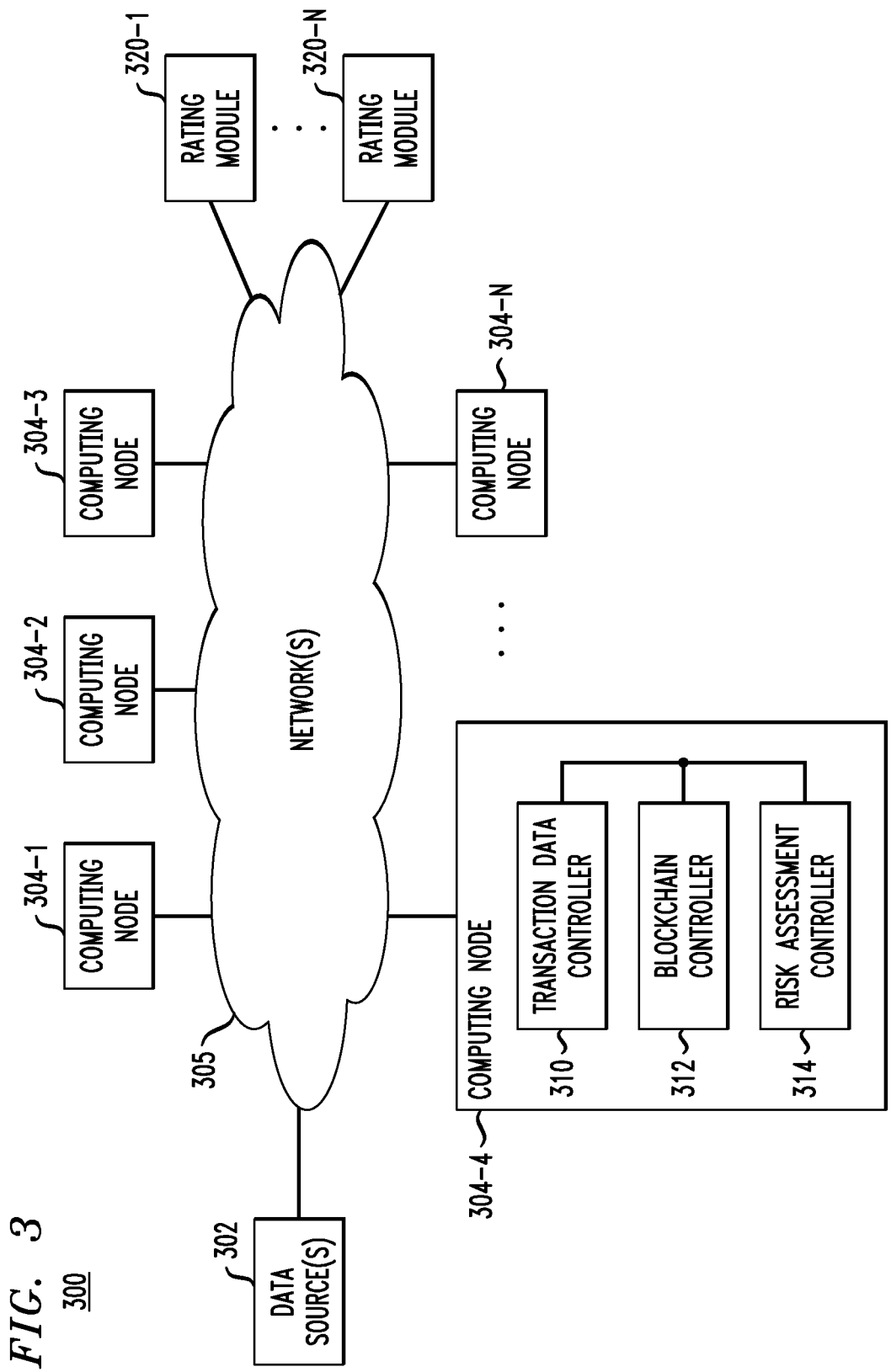
FIG. 3 illustrates a computing platform for tracking data associated with an unmanned aerial vehicle according to an embodiment of the invention.

FIG. 3 illustrates a distributed computing platform on which a blockchain computational system (such as system 200 in FIG. 2) can be implemented. More particularly, as shown, the distributed computing platform 300 in FIG. 3 is similar to system 200 in FIG. 2 in that one or more data sources 302 are operatively coupled to a plurality of computing nodes 304-1, 304-2, 304-3, 304-4, . . . , 304-N. In FIG. 3, one or more communication networks 305 are shown as the mechanism for coupling the data sources 302 and the computing nodes 304-1, 304-2, 304-3, 304-4, . . . , 304-N.

As further shown, FIG. 3 illustrates component details of each of the computing nodes. While the component details are representatively depicted for computing node 304-4, each computing node has such components. Each computing node is configured to include a transaction data controller 310, a blockchain controller 312, and a risk assessment controller 314. While functions of each controller will be described in greater detail below, in general: the transaction data controller 310 manages transaction data including, but not limited to, receiving or otherwise obtaining UAV transaction data; the blockchain controller 312 manages blockchain computation including, but not limited to, accessing the transaction data and generating and validating a block and adding the block to a blockchain; and the risk assessment controller 314 manages risk assessment including, but not limited to, risk factor analysis and alert generation.

More particularly, transaction data, such as data associated with the UAV transactions described above, is provided to any given computing node 304-1, 304-2, 304-3, 304-4, . . . , 304-N (from data source 302 or some other computing node) for use in computing a blockchain. In one example, UAV system 100 is a data source 302. In an illustrative embodiment, a plurality of UAV systems act as data sources for the blockchain network. The transaction data controller 310 is configured to receive or otherwise obtain the transaction data for each computing node, while the blockchain controller 312 is configured to compute the blockchain for each computing node. As will be further explained, the risk assessment controller 314 is configured to operate with the other controllers to track and assess risk with respect to the UAV. Such risk assessment can be used to trigger an addition to the blockchain, as well as to generate alerts or other actions.

As discussed above in the context of FIG. 2, at least a portion of the computing nodes may be configured to participate in a consensus protocol as peers (i.e., validating peers or validating nodes) with one peer being designated as a leader. Validating nodes may be associated with, for example, other UAVs, airspace controllers, UAV owners, regulatory bodies, etc.

The distributed computing platform 300 may further support an electronic tally system. In one embodiment, the distributed computing platform 300 may further comprise a distributed network of one or more rating modules, which are represented by rating modules 320-1 through 320-N in FIG. 3. In one embodiment, each rating module is located, for example, near a restricted area. Each rating module is a computer system running a rating client that is associated with a network communications device. Each rating module is configured to collect ratings, votes, comments, complaints, etc. regarding operation of the UAV. For example, UAVs may be rated on a numeric or other relative scaling system based on their individual adherence to rules of operations. Accordingly, the blockchain may comprise an auditable trail of ratings for the UAV. At the same time, the blockchain can maintain a tally which can be used to detect, correct, and prevent fraud and error in the rating process.

Note also that a unique identifier (UID) or token for a UAV may be used to form a decentralized instrument Internet of Things (IoT) network, wherein items (in this case, UAVs) are considered "smart devices" that are connected to the blockchain through their corresponding UID or token. This allows institutional wide tracking of UAVs. Such an IoT of instruments is embodied by the UAV system architectures in FIG. 1 and the computing platform 300 in FIG. 3. That is, the instruments are trackable through the network(s) 305 that operatively couple the computing nodes that store the blockchain.

Given the above-described examples of transaction data (e.g., described in the context of FIGS. 2 and 3), FIG. 4 illustrates a blockchain 400 for tracking transactions related to a UAV, according to an embodiment of the invention. Each computing node in the computing platform 300 is configured to compute blockchain 400. As shown, each block (after block 1) includes a new transaction for the UAV plus a hash value computed for the previous block. Thus, each data block in the blockchain represents a given set of transaction data plus a set of all previous transaction data, e.g., block N contains data for UAV transaction N plus a hash value that represents all previous N−1 blocks.

Figure 5A:
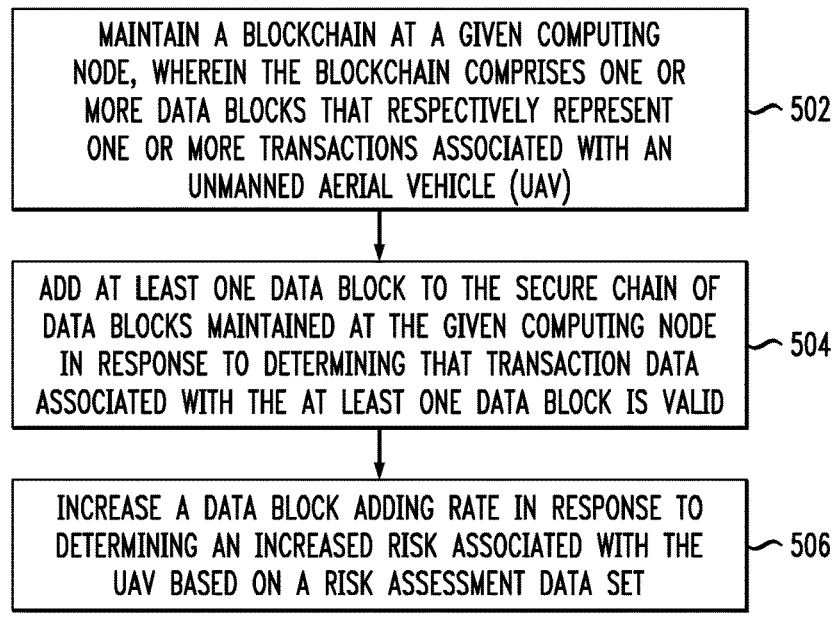
FIG. 5A illustrates a blockchain methodology for tracking transaction data according to an embodiment of the invention.

FIG. 5A illustrates a blockchain methodology 500 for tracking UAV data according to an embodiment of the invention. This methodology 500 can be performed by each computing node in the computing platform 300. In step 502, a blockchain is maintained at a given computing node. The blockchain comprises one or more data blocks that respectively represent one or more transactions associated with a UAV. Note that, in illustrative embodiments described herein, step 502 is performed by the blockchain controller 312 based on transaction data obtained through the transaction data controller 310. In step 504, a data block is added to the blockchain in response to determining that transaction data associated with the at least one data block is valid.

In one embodiment, a rate at which data blocks are added to the blockchain (i.e., the block append rate) may be modified based on a risk assessment data set. For example, if it is determined that there is an increased risk associated with the UAV based on the risk assessment data set (e.g., if the UAV is flying near certain restricted areas, wildlife preserves, hospitals, etc.), the rate at which the data blocks are added to the blockchain may increase at step 506. Note that, in illustrative embodiments described herein, step 506 is performed by the blockchain controller 312 based on the risk assessment trigger managed by the risk assessment controller 314. Note also that the risk assessment controller 314 may utilize statistical algorithms and/or machine learning models that use historical blockchain or off-chain data. Off-chain data refers to data within the system that is not in a blockchain. For example, off-chain data may refer to multimedia data such as the raw video streaming data captured by the UAV. In one embodiment, the system only stores the hash values of such raw for scalability. Note that although such raw data is not stored as part of the blockchain, in one or more embodiment, access to it is controlled by one or more smart contracts.

A transaction may be any of, by way of example only, registering a UAV, updating UAV details, UAV flying, and UAV performing activities (e.g., video streaming, querying information, uploading information). The blockchain technology is then used to securely maintain data about such transactions (i.e., transaction data) to establish security, trust, accountability and transparency with regard to the UAV without requiring a central authority. Furthermore, any event related to the UAV, including but not limited to hardware maintenance/update, software update, purpose or mission change, etc., may be tracked and stored as a transaction within the UAV blockchain. Such techniques have wide ranging advantages for UAV management.

For example, a UAV may be registered into the blockchain through a UAV registration transaction. During the UAV registration transaction, detailed information regarding the UAV is appended to a historic UAV blockchain. Such detailed information regarding the UAV may include, for example, UAV mission or purpose (e.g., healthcare supplier UAV, heart delivery UAV, emergency response UAV), UAV owner, and other identifying information that may be pertinent to UAV registration.

In one embodiment, upon the first registration of a UAV, a token may be assigned to the UAV (and may also be provided to the owner of the UAV). Any transaction related to the UAV may include the token assigned to the UAV. For example, a query for fetching the details of a UAV may pass the token and a public key. Any authorized entity connected to this system may verify the identity of the UAV as long as they present the token as part of the transaction. Further details regarding a query for fetching the details of the UAV will be described below with reference to FIG. 6.

Any event or information related to the UAV may be tracked and added to the UAV blockchain. For example, the UAV blockchain may further include information on presence, activation, and/or capabilities of UAV sensors (e.g., wavelength sensitivity, sensor types such as, e.g., thermal and/or chemical, and sensor resolution), actuators, software versions (e.g., collision avoidance software), communication features, etc.

For example, it is realized that a UAV equipped with very sophisticated or high-resolution sensors could be of more concern (e.g., for privacy and security) than a UAV with no such sensors, and thus this information is added to the blockchain. By way of further example, if a sensor is turned on (activated) or turned off, this information is added to the blockchain.

Figure 5B:
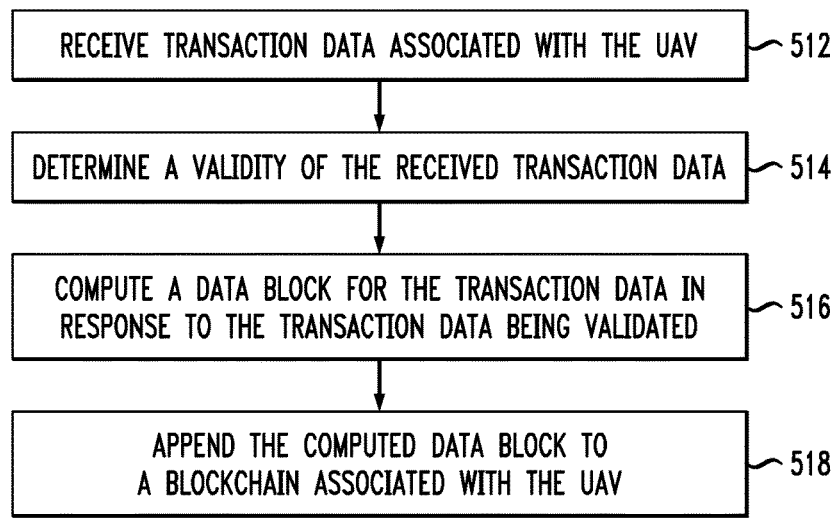
FIG. 5B illustrates a blockchain methodology for adding transaction data to a blockchain according to an embodiment of the invention.

FIG. 5B illustrates a methodology 510 for adding data to a blockchain that is used to track a UAV according to an embodiment of the invention. The methodology 510 is a more detailed example of step 504 in FIG. 5A. As shown, in step 512, a computing node in the computing platform 300 receives transaction data associated with the UAV. In step 514, a computing node in the computing platform 300 determines a validity of the received transaction data. In step 516, a computing node in the computing platform 300 computes a data block for the transaction data in response to the transaction data being validated. In step 518, a computing node in the computing platform 300 appends the computed data block to a blockchain associated with the UAV.

It is to be appreciated that each step of methodology 510 can be performed at the same computing node or the one or more steps can be separately performed at different computing nodes. That is, depending on the consensus protocol used (assuming one is used), the steps are distributively performed across the computing platform 300 or within each computing node. The result is that each computing node preferably maintains the same updated blockchain for the UAV.

Figure 5C:
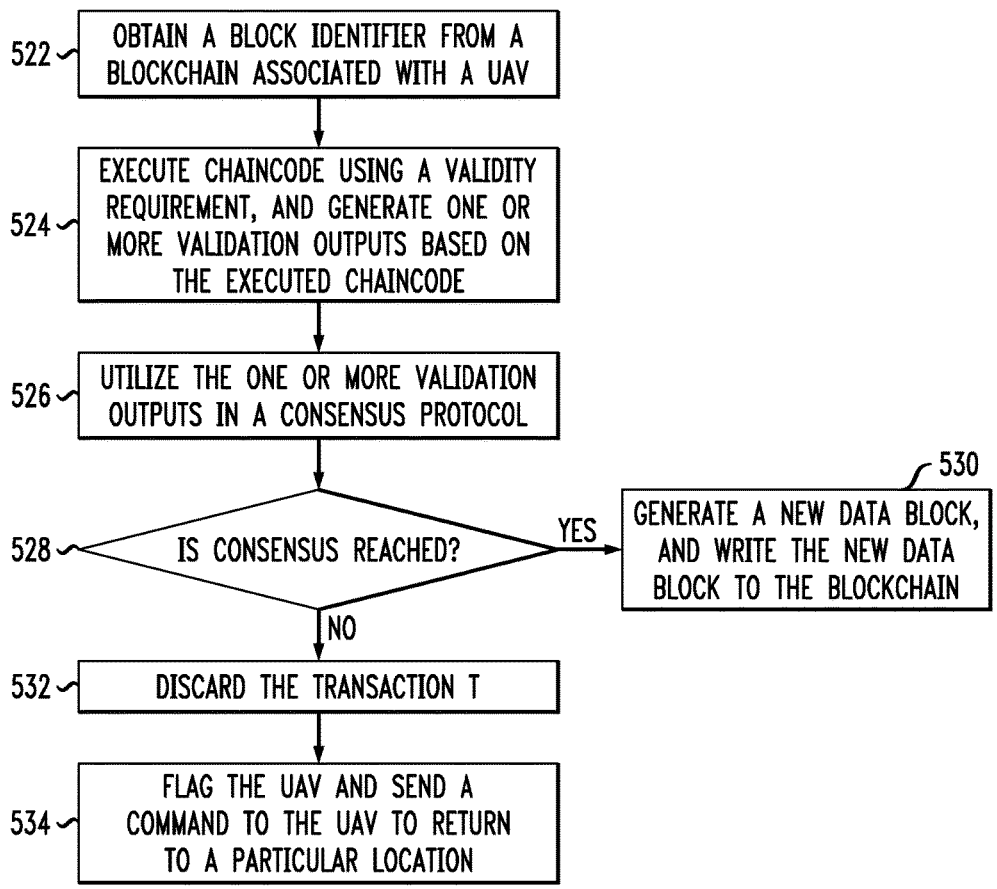
FIG. 5C illustrates a blockchain methodology for validating transaction data according to an embodiment of the invention.

FIG. 5C illustrates a blockchain methodology 520 for validating received transaction data according to an embodiment of the invention. The methodology 520 is a more detailed example of step 514 in FIG. 5B. This methodology 520 can be performed by each computing node in the computing platform 300.

At step 522, a block identifier is obtained from a blockchain associated with a UAV. In one embodiment, one or more validating devices/nodes (i.e., validating peers) obtain the block identifier from the blockchain. The blockchain may represent a chronicle of activities associated with the UAV, such as the particular rating, UAV history, historic flying logs of UAV operators, etc.

In one embodiment, the validating peers may be based on open blockchain technology (i.e., based on the principle of a permissioned network). In another embodiment, the validating peers may be based on a permission-less blockchain technology, where the validating peers establish a validity of the transaction and generate a new block via a "proof-of-work" principle. Although the methodology described herein in FIG. 5C focuses on the use of validating peers based on open blockchain technology, the principles described herein may be applied to validating peers based on permission-less blockchain technology.

At step 524, one or more chaincodes ("chaincode") are executed using a validity requirement, and one or more validation outputs are generated based on the executed chaincode. Chaincode is the implementation of the business logic in a computer programming language. Thus, business logic comprises one or more rules describing how things should be done and all participants agree to the rules. By way of example only, a business rule may describe the legal or authorized uses of a UAV. Advantageously, in illustrative embodiments, each participating computing node in the blockchain network runs the same chaincode, and thus adheres to the same business logic/rules.

Thus, the chaincode may be employed to track or validate transactions associated with the UAV. In one embodiment, at least a portion of the validating peers execute the chaincode, and generate respective validation outputs. The chaincode may be computer programs deployed at each validating peer. In one embodiment, the at least a portion of the validating peers comprises all of the validating peers. The chaincode block of validating devices may take into consideration one or more tokens, such as one or more security and privacy (S&P) tokens associated with the UAV.

The validity requirement may be received with respect to, for example, one or more of UAV operator rating, feedback or comments, UAV behavior, flying actions indicating criteria that must be met in order for the validation system to accept a validation event with respect to the transaction. In one embodiment, the validity requirement is encoded in the chaincode. Additional data may be encoded in the chaincode as well. Additionally, flying safety and/or law enforcement regulations and/or standards may be encoded in the chaincode to validate the UAV behavior with respect to these regulations and/or standards.

At step 526, the validation outputs generated by the validating peers are received by a consensus algorithm.

At step 528, it is determined if consensus has been reached. If yes, a new block is written to the blockchain at step 530. However, if a consensus has not been reached, the new block is discarded at step 532. Accordingly, validated transactions are added to the blockchain.

In one embodiment, if there is no consensus on the UAV's behavior during a flight, the UAV may also be flagged and sent a command to return to a particular location at step 534. For example, authorized owners or blockchain miners may flag the UAV. The particular location may be, for example, a predetermined location, an agreed-upon location, its docking station, etc. In one embodiment, the command to return to the particular location may specify that the UAV remain grounded for a given time period. Alternatively, the UAV may be forced to remain grounded until it is subsequently cleared to fly.

Figure 6:
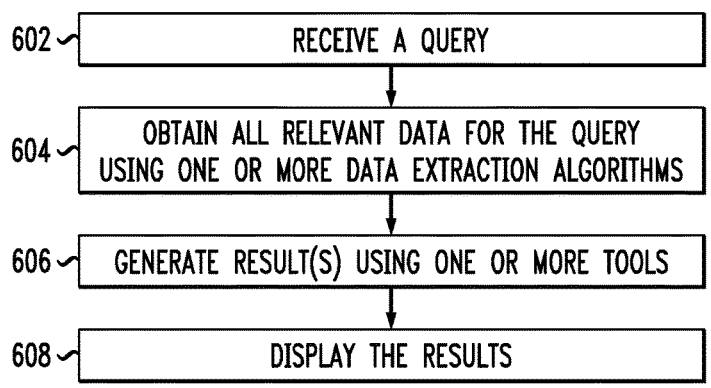
FIG. 6 illustrates a methodology for processing a query received in relation to an unmanned aerial vehicle according to an embodiment of the invention.

FIG. 6 illustrates a methodology 600 for providing query service associated with a blockchain, according to an embodiment of the present invention.

As shown, at step 602, the blockchain system receives a query. In one embodiment, a client device generates the query and sends the query to the blockchain system, e.g., to one or more of the nodes in FIG. 3. The query may comprise one or more of a count rating query, a fake rating query, a sentiment query, a feature query and a cohort query.

At step 604, the data associated with the blockchain is obtained using one or more (intelligent) data extraction algorithms. For example, conventional data extraction techniques can be used to extract the queried data from the blockchain.

At step 606, one or more results are generated using one or more tools, and the one or more results are sent to the client device in satisfaction of the query. In one embodiment, the one or more tools include one or more analytic algorithms and one or more built-in functions via one or more application programming interfaces (APIs) (e.g., Restful APIs). Examples of built-in functions include, for example, History( ) Journey( ) and Compliance( ) History( ) takes the token associated with the UAV as input, and returns a history of UAV flight. The history of the UAV flight may either be in the last few minutes, such as while in a risky situation, or for longer periods of time. Journey( ) takes the token associated with the UAV and a time T as inputs, and returns a journey map of the UAV over time T. The Journey( ) function may be useful in the context of UAV tracking. Compliance( ) takes the token associated with the UAV and a location L of the UAV, and returns a security and privacy (S&P) or compliance level of the location L.

At step 608, the results are transmitted to the client device for display.

Illustrative embodiments described herein store data associated with a UAV in a blockchain system, where any data transaction is managed by consensus. The UAV may be a registered member through a blockchain membership system. In one embodiment, the blockchain membership system is a public key infrastructure (PKI) system. PKI refers to a set of roles, policies and procedures for creating, managing, distributing, using, storing and revoking digital certificates, and managing public-key encryption. PKI generates the right public-private key pair to be associated to the UAV. In this way, any data uploaded to the blockchain associated with the UAV may be signed using the private key associated with the UAV.

Many advantages are realized through the blockchain computational system described herein. Illustrative embodiments described herein may be utilized to track information associated with the UAV. Similarly, the health, status, condition, behavior, etc. of the UAV may be monitored by querying the blockchain of the UAV. In some embodiments, the UAV may be part of an Internet of Things (IOT) network. In these embodiments, the UAV may access UAV traffic information, collect information about the environment (e.g., wind, rain, snow, darkness), and upload the accessed and collected information into the blockchain associated with the UAV. The collection of the environment data may be obtained from one or more instruments, such as one or more sensors (e.g., 116 in FIG. 1) associated with the UAV.

The blockchain computational system described herein may also be used to facilitate a variety of services, including but not limited to: (1) lock in attribution by creating a permanent and unbreakable link between a vehicle and its transactions/traversals; (2) secure sharing of transactions/traversals with other interested parties by transferring or copying a transaction/traversal record; (3) increase visibility by helping trace where and how UAV transactions/traversals spread through a region (e.g., by showing all locations that the UAV has appeared and/or all of the transactions/traversals the UAV had over time); (4) certificate of authenticity (CoA) functionality (e.g., each registered transaction/traversal may come with a CoA, a built-in unique cryptographic ID and the complete transaction history, so that the CoA can be verified at any time and/or printed out); (5) limited digital edition creation; and (6) licensing by helping users transfer or loan a UAV from one UAV service to another.

The blockchain computational system described herein may facilitate mining of blockchains of one or more UAVs. As one example, the blockchain computational system may facilitate the mining of blockchains of other UAVs flying in the vicinity (i.e., radius) of a given UAV in real (or near-real) time, as well as in the past for a region of space. The vicinity or radius parameter may be controlled or adjusted based on the mission or purpose of the UAV. To illustrate, the given UAV may detect that six other UAVs are in the vicinity of the given UAV, but only five of those six are actively updating their blockchains. Such a situation may indicate an area of concern regarding the UAV that is not actively updating its blockchain. As another example, the blockchain computational system may facilitate the mining of a block associated with a given UAV to determine if the given UAV is exhibiting erratic flying behavior. The system may further assign a confidence level to the determination. As yet another example, the blockchain computational system may facilitate the mining of a block associated with a given UAV to determine if the operation of the UAV has committed a security and privacy violation and/or a compliance violation. If so, further action may be taken depending on the level of the violation or the risk level due to the violation. Examples of actions that may be taken include, for example, transmission of a signal to authorities, monetary fine, flying restriction (e.g., if the UAV violated safety standards), etc.

The blockchain computational system described herein may be used to implement a UAV warning system. For example, a moderator may define a flying protocol for a given zone (which may be different for each day/hour). The protocol can be defined in terms of thresholds on various attributes (e.g., maximum number of UAVs flying at a given point, maximum allowed speed, etc.) The attributes of the UAVs can be compared against the protocol, and the UAVs violating the protocol can be warned to comply. In one embodiment, predictive models of UAV movements may be generated and used in order to send an early warning to those UAVs that are predicted to violate the protocol in the (near) future.

Figure 7:
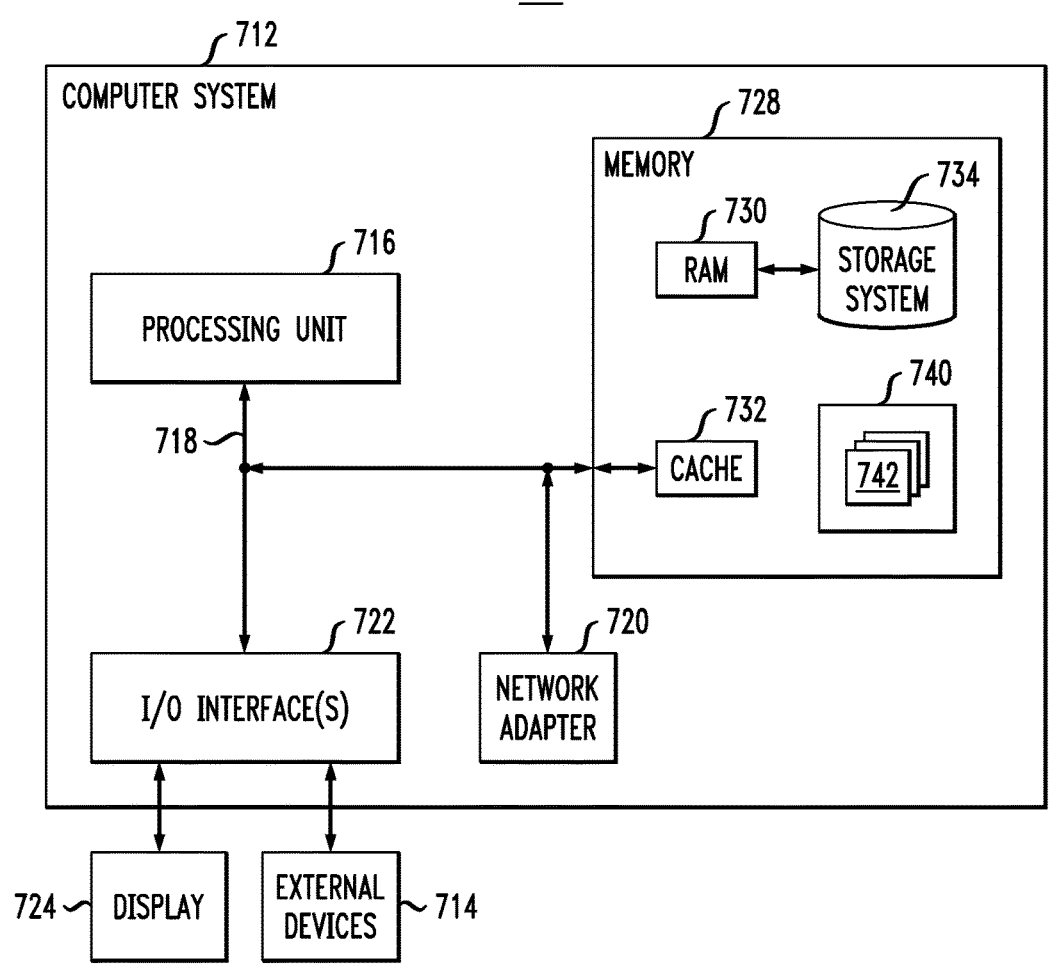
FIG. 7 illustrates a computer system in accordance with which one or more components/steps of techniques of the invention may be implemented according to an embodiment of the invention.

One or more embodiments can make use of software running on a computer or workstation. With reference to FIG. 7, in a computing node 710 there is a system/server 712, which is operational with numerous other general purpose or special purpose computing system environments or configurations. Examples of well-known computing systems, environments, and/or configurations that may be suitable for use with system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each computing node in the computing platform 200 can implement the architecture shown in computing node 710.

System/server 712 may be described in the general context of computer system executable instructions, such as program modules, being executed by a computer system. Generally, program modules may include routines, programs, objects, components, logic, data structures, and so on that perform particular tasks or implement particular abstract data types. System/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, system/server 712 is shown in the form of a computing device. The components of system/server 712 may include, but are not limited to, one or more processors or processing units 716, system memory 728, and bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 712 typically includes a variety of computer system readable media. Such media may be any available media that is accessible by system/server 712, and it includes both volatile and non-volatile media, removable and non-removable media.

The system memory 728 can include computer system readable media in the form of volatile memory, such as random access memory (RAM) 730 and/or cache memory 732. System/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces.

As depicted and described herein, memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

System/server 712 may also communicate with one or more external devices 714 such as a keyboard, a pointing device, an external data storage device (e.g., a USB drive), display 724, one or more devices that enable a user to interact with system/server 712, and/or any devices (e.g., network card, modem, etc.) that enable system/server 712 to communicate with one or more other computing devices. Such communication can occur via I/O interfaces 722. Still yet, system/server 712 can communicate with one or more networks such as a LAN, a general WAN, and/or a public network (e.g., the Internet) via network adapter 720. As depicted, network adapter 720 communicates with the other components of system/server 712 via bus 718. It should be understood that although not shown, other hardware and/or software components could be used in conjunction with system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
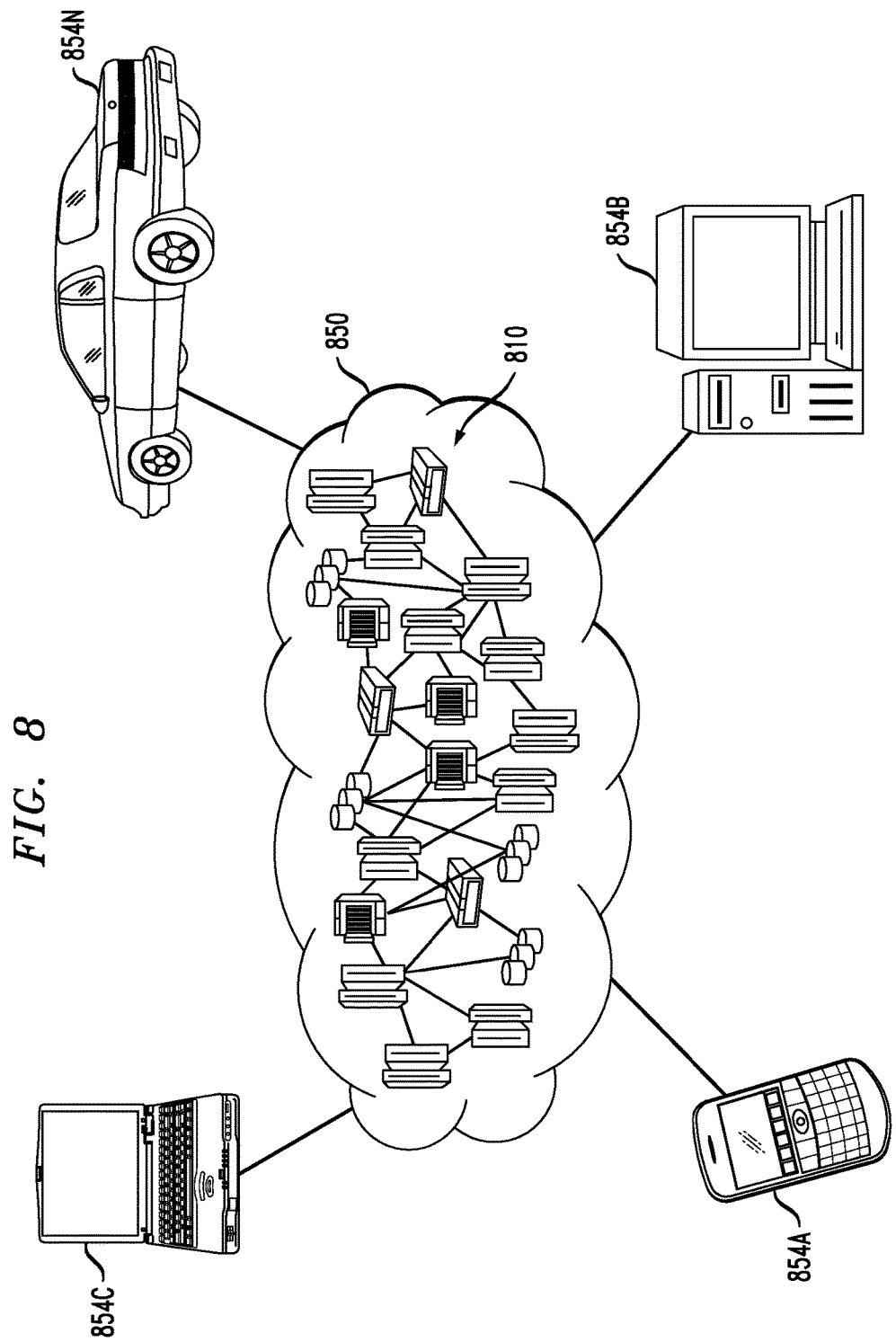
FIG. 8 illustrates a cloud computing environment according to an embodiment of the invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
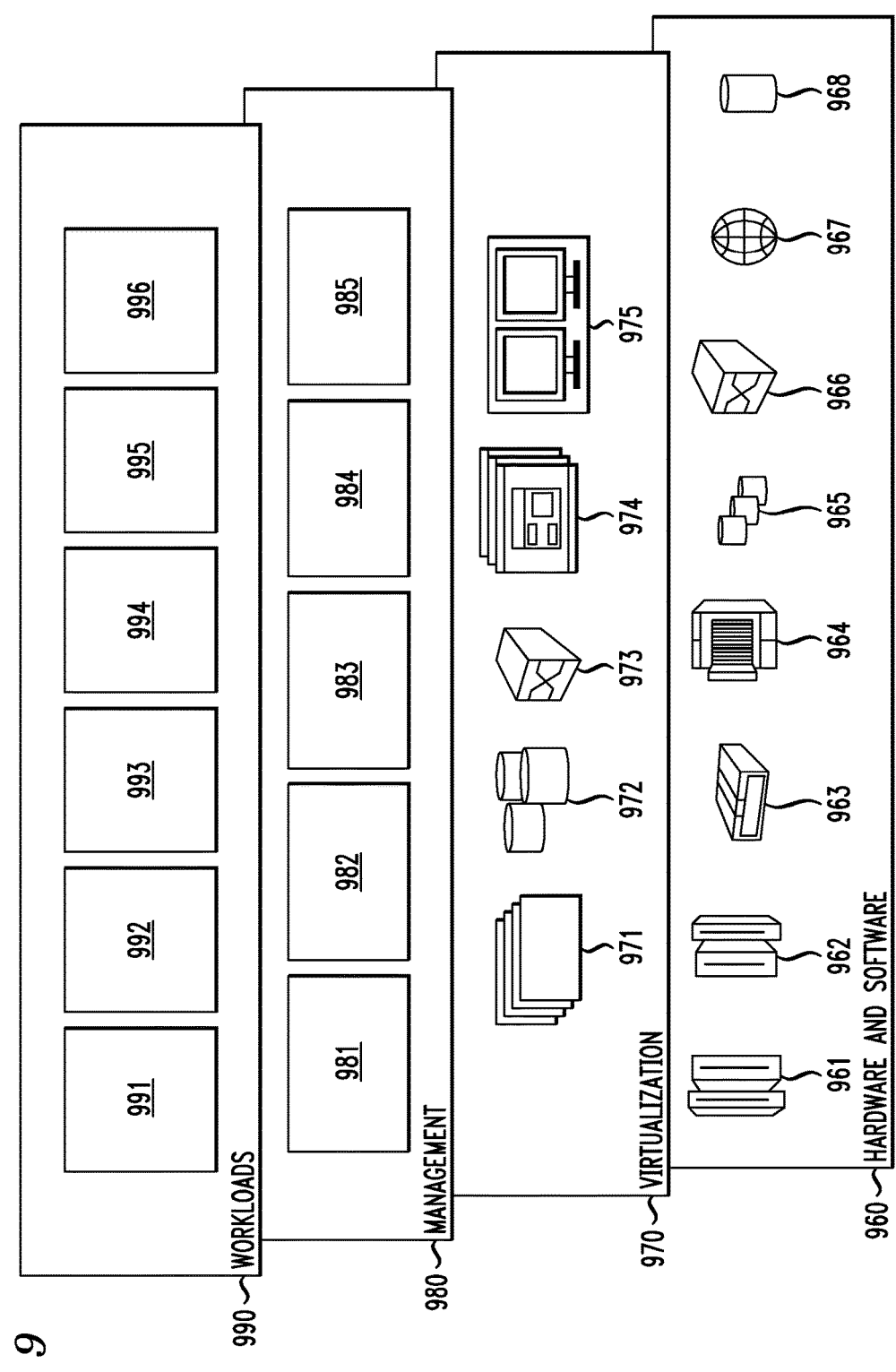
FIG. 9 illustrates abstraction model layers according to an embodiment of the invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: transaction data capture 991; blockchain computation 992; data analytics processing 993; risk assessment 994; alert processing 995; and ameliorative/corrective/remedial action implementation 996, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with an unmanned aerial vehicle (UAV); and
   adding at least one data block to the secure chain of data blocks maintained at the given computing node in response to determining that transaction data associated with the at least one data block is valid;
   wherein the UAV is associated with one or more agreements regarding operation of the UAV, and wherein the secure chain of data blocks is implemented with the one or more agreements to determine that the UAV is meeting the one or more agreements; and
   wherein the maintaining and adding steps are implemented via at least one processor operatively coupled to a memory associated with the given computing node.

2. The method of claim 1, wherein the secure chain of data blocks represents a transaction path of the UAV through time.

3. The method of claim 1, wherein the adding step further comprises the given computing node:
   receiving the transaction data associated with the UAV;
   determining a validity of the received transaction data;
   computing the at least one data block for the transaction data in response to the transaction data being validated; and
   appending the computed data block to the secure chain of data blocks maintained at the given computing node.

4. The method of claim 3, wherein validating the received transaction data comprises:
   obtaining a block identifier from the secure chain of data blocks;
   executing chaincode using a validity requirement; and
   generating one or more validation outputs based on the executed chaincode.

5. The method of claim 4, wherein the one or more validation outputs are utilized in a consensus protocol.

6. The method of claim 5, wherein the data block for the transaction data is computed in response to the consensus protocol determining that a consensus has been reached.

7. The method of claim 3, wherein managing the UAV comprises commanding the UAV to travel to a particular destination in response to the consensus protocol determining that a consensus has been reached.

8. The method of claim 3, wherein transaction data comprises one or more of: data representing health or repair path of the UAV, data representing registration of the UAV, data representing hardware maintenance or updates, data representing software maintenance or updates, data obtained from one or more UAV sensors, data representing presence of one or more sensors on the UAV, data representing capabilities of one or more sensors on the UAV, data representing activation of one or more sensors on the UAV, data representing UAV location, and data representing UAV rating.

9. The method of claim 8, wherein the data representing UAV rating is received via one or more rating modules comprised within a distributed network.

10. The method of claim 3, wherein the transaction data comprises a risk assessment data set.

11. The method of claim 10, wherein the risk assessment data set comprises one or more of: data associated with the UAV that is stored in the secure chain; and data associated with the UAV that is not stored in the secure chain.

12. The method of claim 10, further comprising increasing a data block adding rate in response to determining an increased risk associated with the UAV based on the risk assessment data set.

13. The method of claim 12, wherein the risk assessment data set is analyzed using at least one of a statistical algorithm and a machine learning algorithm.

14. The method of claim 10, wherein the risk assessment data set comprises one or more risk factors relevant to flight of the UAV.

15. The method of claim 14, wherein the one or more risk factors are associated with a proximity of the UAV to a restricted area during the flight of the UAV.

16. A method comprising:
  maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with an unmanned aerial vehicle (UAV); and
  adding at least one data block to the secure chain of data blocks maintained at the given computing node in response to determining that transaction data associated with the at least one data block is valid; and
  one or more of:
  managing the UAV by utilizing the secure chain of data blocks; and
  mining one or more secure chains of data blocks associated with one or more respective UAVs, and determining one or more areas of concern based on the mining;
  wherein the maintaining and adding steps are implemented via at least one processor operatively coupled to a memory associated with the given computing node.

17. The method of claim 16, wherein the one or more areas of concern comprise one or more of erratic flying behavior, security and privacy violation, and compliance violation.

18. An apparatus, comprising:
  at least one processor; and
  a memory operatively coupled to the processor to form a given computing device that is part of a set of computing nodes in a distributed network of computing nodes wherein each of the set of computing nodes maintains a secure chain of data blocks, the processor and memory configured to:
  maintain the secure chain of data blocks at the given computing node, wherein the secure chain of data blocks maintained at each computing node comprises one or more data blocks that respectively represent one or more transactions associated with an unmanned aerial vehicle (UAV); and
  add at least one data block to the secure chain of data blocks maintained at the given computing node in response to determining that transaction data associated with the at least one data block is valid;
  wherein the UAV is associated with one or more agreements regarding operation of the UAV, and wherein the secure chain of data blocks is implemented with the one or more agreements to determine that the UAV is meeting the one or more agreements.

19. The apparatus of claim 18, wherein the secure chain of data blocks represents a transaction path of the UAV through time.

20. A computer program product comprising a processor-readable storage medium having encoded therein executable code of one or more software programs, wherein the one or more software programs when executed by the one or more processors implement steps of:
  maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with an unmanned aerial vehicle (UAV); and
  adding at least one data block to the secure chain of data blocks maintained at the given computing node in response to determining that transaction data associated with the at least one data block is valid;
  wherein the UAV is associated with one or more agreements regarding operation of the UAV, and wherein the secure chain of data blocks is implemented with the one or more agreements to determine that the UAV is meeting the one or more agreements.

* * * * *